Sept. 30, 1930.  H. C. LANDRUS  1,777,171

FURNACE

Filed Feb. 11, 1929

INVENTOR,
Hiram C. Landrus.
BY
Roy E. Hamilton
ATTORNEY.

Patented Sept. 30, 1930

1,777,171

UNITED STATES PATENT OFFICE

HIRAM C. LANDRUS, OF KANSAS CITY, KANSAS

FURNACE

Application filed February 11, 1929. Serial No. 338,928.

This invention relates to furnaces and more especially to hot air furnaces in which the air to be used for heating purposes is raised to a relatively high temperature in the furnace and permitted to pass into the rooms or other points of utilization.

One important object of the invention is to provide a hot air furnace having a combustion chamber in which a hot air chamber is so positioned that all air utilized for heating purposes must pass therethrough before entering the hot air pipes leading to the respective rooms or other points.

A further object is the provision of a centrally located hot air chamber with hot air conduits communicating with the lower portion thereof, and with an outer chamber into which the return air through the cold air ducts is delivered.

Another object is to provide a furnace which will distribute the heat in a more uniform and equable manner and will not be unduly affected by variations in temperature.

Objects are, further, to provide improvements in the firepot and combustion chamber whereby more perfect combustion and utilization of the heat of combustion evolved from the fuel can be secured, thus increasing the efficiency of the furnace and thereby obtaining more economical use of fuel.

With the above and other objects in view which will hereinafter more fully appear, reference will now be had to the accompanying drawing, in which.

Figure 1:
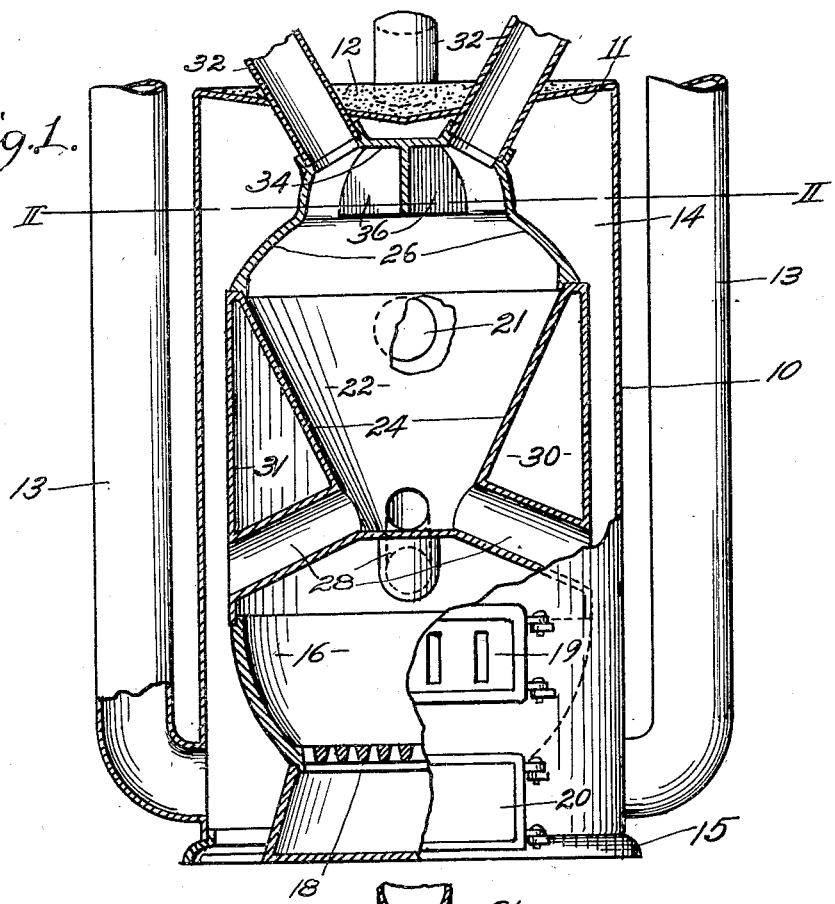
Figure 1 is a front elevation of a furnace, partly broken away embodying the invention.
Figure 2:
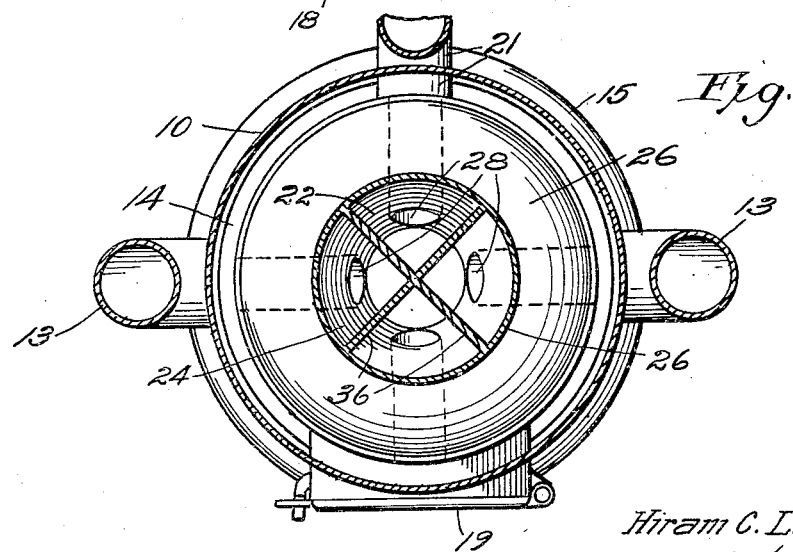
Fig. 2 is a horizontal sectional view taken on line II—II of Fig. 1.

Referring in detail to the various parts forming the invention, 10 designates an outer casing of the usual cylindrical type having a slightly concave top 11, on which may be placed any suitable heat insulating material 12. When desired, the side walls of the casing 10 may also be insulated.

Located within the casing 10 and spaced apart therefrom is a fire box 16 provided at its lower portion with a grate 18 beneath which is the usual ash pit. The fire box and ash pit are provided with the usual openings which are closed by doors 19 and 20 respectively. A flue 21 communicates with the upper portion of the combustion chamber 30 for conveying away the products of combustion.

Centrally located above the fire box 16 is an inner air chamber 22, the side wall 24 of which converges downwardly, while the top wall 26 converges upwardly. Connecting the lower portion of the air chamber 22 with the outer chamber 14 are a plurality of conduits 28 which preferably are upwardly and inwardly inclined and serve to convey the air from the outer chamber 14 into the lower portion of said inner air chamber 22, where it is highly heated by the heat produced in the surrounding combustion chamber 30. The combustion chamber jacket 31 is of substantially the ordinary form. A plurality of hot air conducting pipes 32 communicate with the top of the hot air chamber 22 and lead to the respective rooms to be heated. It will be particularly noticed that by arranging the wall 24 and conduits 28 at an angle with relation to the combustion chamber 30 that said wall and conduits will present a greater area to the heat in the combustion chamber 30 and will accordingly prove more efficient.

In order to direct the heated air from the hot air chamber 22 into the hot air conducting pipes 32 in an equable and uniform manner, a deflector is employed consisting of a top portion 34 and a plurality of partitions 36, the spaces provided by said partitions being preferably equal in number to the hot air conducting pipes 32, in order that each hot air conducting pipe may receive its proper proportion of heated air and conduct it to its respective room or other point of utilization.

As will be noticed by referring to Fig. 1 of the drawing, the upper portion of the air chamber 14 surrounds the upper part of the hot air chamber 22 and the lower ends of the heat conducting pipes 32, thus serving to impart the heat thereto that accumulates in the upper portion of said air chamber and thereby increasing the efficiency of the furnace.

The operation is as follows: Cold air enters the pipes 13 which communicate with the chamber 14 adjacent its lower portion, passes downwardly and thence into the chamber 14 surrounded by the casing 10. Said air contacts the fire pot 16 and wall 31 of the combustion chamber 30 and is heated thereby, which causes it to rise to the top of the chamber 14 and impart its heat to the wall 26 of the hot air chamber and the outer surface of the conducting pipes 32. In the meantime, a large portion of the air in the chamber 14 passes through the pipes 28 into the heating chamber 22 and is therein heated to a high degree, after which it passes upwardly and, due to the partitions 36 of the deflector, is directed uniformly into the hot air conducting pipes 32, and thence to the respective rooms.

It will be noted that the parts of the inner portion of the furnace are properly divided to facilitate their manufacture; however, this is not essential to the operation of the furnace.

While I have shown and described what is now deemed to be the preferred form of embodiment of the present invention, yet I desire to reserve the right to make such alterations and amendments as may fairly fall within the scope of the appended claims.

What I claim is:

1. In a hot air furnace, the combination with a fire box, combustion chamber, and an outer chamber, of an inner air chamber arranged within said combustion chamber, conduits for conducting air from the outer chamber to said inner air chamber, and conduits communicating with the upper portion of said inner chamber for conducting the heated air therefrom, and partitions extending downwardly from the upper portion of said inner chamber intermediate adjacent conduits.

2. In a hot air furnace, the combination with a fire pot and combustion chamber, of a heating chamber within said combustion chamber, a closed outer chamber surrounding said fire pot, combustion chamber and heating chamber and adapted to receive heat from the fire pot and combustion chamber and impart it to the heating chamber, conduits connecting said heating chamber with said chamber adjacent the lower portion thereof, and means for conducting the heated air from the heating chamber.

3. In a hot air furnace, the combination with a fire pot, combustion chamber and inner heating chamber positioned in said combustion chamber; of a closed outer chamber surrounding said fire pot, combustion chamber and heating chamber, means for introducing cold air into the lower portion of the outer chamber, means for conducting air from said outer chamber into the lower portion of said inner heating chamber, and means for conducting the heated air from the inner heating chamber.

4. In a hot air furnace, a fire pot, a combustion chamber arranged over said fire pot, an inner heating chamber arranged within said combustion chamber, a closed outer casing surrounding the fire pot, the combustion chamber and the heating chamber and forming an outer chamber therebetween, means for introducing cold air into the lower portion of the outer chamber, means for introducing a portion of the heated air from the lower portion of said outer chamber into the lower portion of said inner chamber, and a plurality of pipes for conducting the hot air from the inner chamber.

5. In a hot air furnace, a fire pot, a combustion chamber, an air chamber having a downwardly converging wall positioned within said combustion chamber, the upper portion of said air chamber extending above said combustion chamber and having downwardly extending partitions to form separate compartments therein, a hot air pipe communicating with each of said compartments, an outer casing spaced apart from said combustion chamber to form an outer chamber surrounding said combustion chamber and the upper portion of said air chamber, cold air ducts communicating with the lower portion of said outer chamber, and upwardly and inwardly inclined conduits connecting said outer chamber with said air chamber at its lower extremity.

In testimony whereof, I hereunto affix my signature.

HIRAM C. LANDRUS.